(12) United States Patent
Nizar et al.

(10) Patent No.: US 12,265,890 B2
(45) Date of Patent: Apr. 1, 2025

(54) EXTRACTED MODEL ADVERSARIES FOR IMPROVED BLACK BOX ATTACKS

(71) Applicant: Oracle International Corporation, Redwood Shores, CA (US)

(72) Inventors: Naveen Jafer Nizar, Chennai (IN); Ariel Gedaliah Kobren, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1106 days.

(21) Appl. No.: 17/115,941

(22) Filed: Dec. 9, 2020

(65) Prior Publication Data

US 2022/0051134 A1    Feb. 17, 2022

(51) Int. Cl.
*G06N 20/00*     (2019.01)
*G06F 18/2113*   (2023.01)
*G06F 18/214*    (2023.01)
*G06F 18/22*     (2023.01)

(52) U.S. Cl.
CPC ......... *G06N 20/00* (2019.01); *G06F 18/2113* (2023.01); *G06F 18/214* (2023.01); *G06F 18/22* (2023.01)

(58) Field of Classification Search
CPC ..... G06N 20/00; G06F 18/22; G06F 18/2113; G06F 18/214
See application file for complete search history.

(56) References Cited

PUBLICATIONS

Krishna, Kalpesh, et al. "Thieves on sesame street! model extraction of bert-based apis." arXiv preprint arXiv:1910.12366 (2019). (Year: 2019).*
Papernot, Nicolas, et al. "Practical black-box attacks against machine learning." Proceedings of the 2017 ACM on Asia conference on computer and communications security. 2017. (Year: 2017).*
Jia, Robin, and Percy Liang. "Adversarial examples for evaluating reading comprehension systems." arXiv preprint arXiv: 1707.07328 (2017). (Year: 2017).*
Cai, Jinghui, et al. "Accelerate black-box attack with white-box prior knowledge." Intelligence Science and Big Data Engineering. Big Data and Machine Learning: 9th International Conference, IScIDE 2019, Nanjing, China, Oct. 17-20, 2019, Proceedings, Part II 9. Springer International Publishing, (Year: 2019).*
Alzantot et al., "Generating Natural Language Adversarial Examples", CoRR, 2018, arXiv:1804.07998.

(Continued)

*Primary Examiner* — Eric Nilsson
(74) *Attorney, Agent, or Firm* — Invoke (57) ABSTRACT

Techniques are described for identifying successful adversarial attacks for a black box reading comprehension model using an extracted white box reading comprehension model. The system trains a white box reading comprehension model that behaves similar to the black box reading comprehension model using the set of queries and corresponding responses from the black box reading comprehension model as training data. The system tests adversarial attacks, involving modified informational content for execution of queries, against the trained white box reading comprehension model. Queries used for successful attacks on the white box model may be applied to the black box model itself as part of a black box improvement process.

22 Claims, 5 Drawing Sheets

(56) References Cited

PUBLICATIONS

Belinkov et al., "Synthetic and Natural Noise Both Break Neural Machine Translation", 2017, arXiv:1711.02173.

Botta, "Getting to know a black-box model", 12 pages, 2018, https://towardsdatascience.com/getting-to-know-a-black-box-model-374e180589ce.

Devlin et al., "BERT: Pre-training of Deep Bidirectional Transformers for Language Understanding", 2019, arXiv:1810.04805.

Du et al., "A Hybrid Adversarial Attack for Different Application Scenarios†", Applied Sciences, vol. 10, No. 10, https://doi.org/10.3390/app10103559.

Feng et al., "Pathologies of Neural Models Make Interpretations Difficult", In Proceedings of the 2018 Conference on Empirical Methods in Natural Language Processing, 2018, pp. 3719-3728.

Francis et al., "Brown corpus manual", Technical report, Department of Linguistics, Brown University, Providence, Rhode Island, US, 1979. http://korpus.uib.no/icame/manuals/BROWN/INDEX.HTM.

Hosseini et al., "Deceiving Google's Perspective API Built for Detecting Toxic Comments", CoRR, 2017, arXiv:1702.08138.

Jansen et al., "Discourse Complements Lexical Semantics for Non-factoid Answer Reranking", In Proceedings of the 52nd Annual Meeting of the Association for Computational Linguistics, 2014, pp. 977-986.

Jia et al., "Adversarial Examples for Evaluating Reading Comprehension Systems", CoRR, 2017, arXiv:1707.07328.

Jin et al., "Is BERT really robust? natural language attack on text classification and entailment", CoRR, 2019, abs/1907.11932.

Krishna et al., "How to steal modern NLP systems with gibberish?", 2020. http://www.cleverhans.io/2020/04/06/stealing-bert.html.

Krishna et al., "Thieves of sesame street: Model extraction on bert-based apis", ICLR, 2020.

Li et al., "BERT-ATTACK: Adversarial Attack Against BERT Using BERT", 2020, arXiv:2004.09984.

Li et al., "TextBugger: Generating Adversarial Text Against Real-world Applications", CoRR, 2018, arXiv:1812.05271.

Manning et al., "The Stanford CoreNLP Natural Language Processing Toolkit", Proceedings of 52nd Annual Meeting of the Association for Computational Linguistics: System Demonstrations, 2014, pp. 55-60.

Merity et al., "Pointer Sentinel Mixture Models", CoRR, 2016, arXiv:1609.07843.

Miller, "WordNet: a lexical database for English", Commun. ACM., vol. 38, No. 11, 1995, 39-41.

Papernot et al., "Practical Black-Box Attacks against Machine Learning", In Proceedings of the 2017 ACM on Asia Conference on Computer and Communications Security, ASIA CCS '17, 2017, pp. 506-519.

Pennington et al., "GloVe: Global Vectors for Word Representation", Proceedings of the 2014 Conference on Empirical Methods in Natural Language Processing (EMNLP), 2014, pp. 1532-1543.

Radford et al., "Language Models are Unsupervised Multitask Learners", 2019.

Rajpurkar et al., "SQuAD: 100,000+ Questions for Machine Comprehension of Text", Proceedings of the 2016 Conference on Empirical Methods in Natural Language Processing (EMNLP), 2016, pp. 2383-2392.

Ribeiro et al., "Semantically Equivalent Adversarial Rules for Debugging NLP Models", In Proceedings of the 56th Annual Meeting of the Association for Computational Linguistics (vol. 1: Long Papers), 2018, pp. 856-865.

Seo et al., "Bidirectional Attention Flow for Machine Comprehension", ICLR, 2017, arXiv:1611.01603.

Shi et al., "Next Sentence Prediction helps Implicit Discourse Relation Classification within and across Domains", Proceedings of the 2019 Conference on Empirical Methods in Natural Language Processing and the 9th International Joint Conference on Natural Language Processing (EMNLP-IJCNLP), 2019, pp. 5790-5796.

Szegedy et al., "Intriguing properties of neural networks", 2014, arXiv:1312.6199.

Szyller et al., "PRADA: Protecting Against DNN Model Stealing Attacks", IEEE European Symposium on Security and Privacy (EuroS&P), 2019.

Vaswani et al., "Attention is all you need," In Proceedings of the 31st International Conference on Neural Information Processing Systems, NIPS'17, 2017, pp. 6000-6010.

Vaz, "Adversarial Attack Strategies on Machine Reading Comprehension Models", 2019.

Vijayaraghavan et al., "Generating Black-Box Adversarial Examples for Text Classifiers Using a Deep Reinforced Model", Joint European Conference on Machine Learning and Knowledge Discovery in Databases, 2019, pp. 711-726.

Wallace et al., "Universal Adversarial Triggers for Attacking and Analyzing NLP", In Proceedings of the 2019 Conference on Empirical Methods in Natural Language Processing and the 9th International Joint Conference on Natural Language Processing (EMNLP-IJCNLP), 2019, pp. 2153-2162.

Xie et al., "Unsupervised Data Augmentation for Consistency Training", CoRR, 2019, arXiv:1904.12848.

Zhang et al., "Adversarial Attacks on Deep learning Models in Natural Language Processing: A Survey", ACM Transactions on Intelligent Systems and Technology, 2019.

\* cited by examiner

Informational Content 304: Nearby, in Ogod Saski (the Saxon Garden), the SUmmer Theater was in operation from 1870 to 1939, and in the inter-war period, the theatre complex also included Momu, Warsaw's first literary caberet, and Leon Schiller's musical theatre Melodram. The Wojciech Bogulslawski Theatre (1922-26), was the best example of "Polish monumental theatre". From the mid-1930s, the Great Theatre building house the Upati Institute of Dramatic Arts - the first state-run academy of dramatic art, with an acting department and a stage directing department.

Adversarial Perturbation 308: theatre best monumental example was example theatre example land main.

Query 312: What theatre was the best example of "Polish monumental theatre"?

Query Result Without Adversarial Perturbation 316: Wojciech Boguslawski Theatre

Query Result With Adversarial Perturbation 320: land main

FIG. 4

EXTRACTED MODEL ADVERSARIES FOR IMPROVED BLACK BOX ATTACKS

INCORPORATION BY REFERENCE; DISCLAIMER

This application is hereby incorporated by reference: Provisional application no. 202041034978 filed on Aug. 14, 2020 in India. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to reading comprehension models. In particular, the present disclosure relates to extracted model adversaries for improved black box attacks.

BACKGROUND

Reading comprehension machine learning models, which include natural language processing (NLP) modules, are commonly applied in a variety of contexts and commonly used. While generally effective, models may make errors in their interpretation of content. Correcting a reading comprehension machine learning model to avoid an error is challenging given that these models may function based on the values of millions or billions of non-linearly interacting parameters.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. MODEL TRAINING AND ADVERSARIAL ATTACK
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

In general, reading comprehension models generate results (alternately referred to as "responses") to queries based on informational content. A white box reading comprehension model may output a set of candidate responses to the query. These candidate responses may be ranked according to corresponding confidence levels. In contrast, a black box reading comprehension model may output a single response to the query that has been selected from a set of the candidate responses. Because a white box reading comprehension model provides multiple candidate responses and corresponding confidence levels, white box reading comprehension models generally provide greater insight into execution of a query.

Adversarial attacks on a reading comprehension model may be used to analyze performance of a reading comprehension model by modifying the informational content (e.g., a passage of text) that is used to generate the results for a query. As an example, adversarial attacks may add non-sensical, or randomly selected terms/phrases to the informational content which may negatively impact the performance of a reading comprehension model. A successful adversarial attack may result in (a) the reading comprehension model not identifying the correct response to a particular question, (b) ranking the correct response, in a set of candidate responses to the particular question, lower than a threshold rank, or (c) determining a confidence level, associated with the correct response to the particular question, below a threshold confidence level. Data regarding adversarial attacks that are successful against a reading comprehension model may be used, for example, to analyze or improve the reading comprehension model.

One or more embodiments identify successful adversarial attacks for a target black box reading comprehension model using an extracted white box reading comprehension model. That is, the system captures behavior of the target black box reading comprehension model as (a) a set of queries mapped to (b) corresponding results outputted by the target black box reading comprehension model. Using the set of queries and corresponding responses from the target black box reading comprehension model as training data, the system trains a white box reading comprehension model. In this way, the trained white box reading comprehension model may be trained to behave similarly to the black box reading comprehension model. This is sometimes referred to herein as the white box reading comprehension model being an "approximation" or "simulation" of the black box reading comprehension model or being "extracted" from the target black box model.

Specifically, the system trains the white box reading comprehension model to generate results for a set of queries that meet a similarity criteria relative to results generated by the black box reading comprehension model for the same set of queries. The system tests adversarial attacks, involving modified informational content, against the trained white box reading comprehension model. Adversarial attacks that are found to be successful against the white box reading comprehension model are selected for analyzing or improving the black box reading comprehension model. As an example, a successful adversarial attack may result in a correct response to a particular question not being included in the k highest-ranked results generated by the white box reading comprehension model. In some examples, queries used for successful attacks on the white box model may be applied to the black box model itself as part of a black box improvement process.

One or more embodiments described in this Specification and/or recited in the claims may not be included in this General Overview section.

2. Architectural Overview

Figure 1:
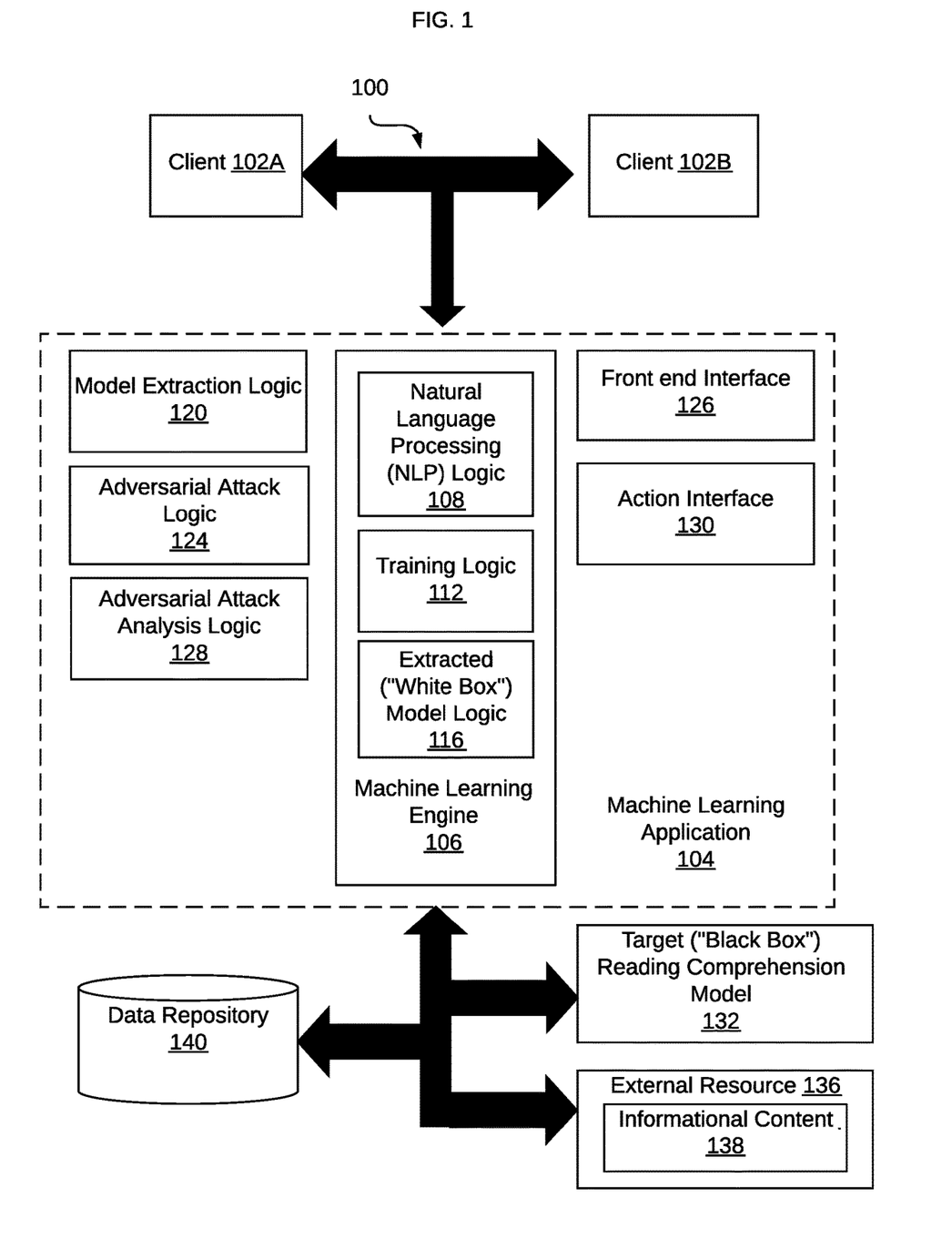
FIG. 1 illustrates a system in accordance with one or more embodiments.

FIG. 1 illustrates a system 100 in accordance with one or more embodiments. As illustrated in FIG. 1, system 100 is configured for generating machine learning models that (1) simulate analysis of a target black box model and that (2) generate a plurality of query responses and corresponding confidence intervals. The system 100 may be used to improve the analytical performance of black box reading comprehension machine learning models for which multiple query responses and confidence intervals are not available. The system 100 includes clients 102A, 102B, a machine learning application 104, an external target black box reading comprehension model 132, an external resource 136, and a data repository 140.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in Section 5, titled "Computer Networks and Cloud Networks."

In some examples, the clients 102A, 102B may be a web browser, mobile application, or other software application communicatively coupled to a network. In other examples, a client 102A, 102B may be associated with a human user (such as a system administrator or data scientist) or associated with another application, such as a shell or client application. In some examples, a client 102A, 102B is an interface used for communication between systems or between operators.

A client may interact with an embodiment of the machine learning application 104 that is instantiated as a cloud service using one or more communication protocols, such as HTTP and/or other communication protocols of the Internet Protocol (IP) suite. In other embodiments, in which ML application 104 may be instantiated as a local system (e.g., via an "on-premises" computer system), the clients 102A, 102B may be a desktop or other standalone application that may access the ML application 104. In some embodiments, ML application 104 is a cloud service, such as a software-as-a-service (SaaS) or a web service.

The ML application 104 includes a machine learning engine 106, model extraction logic 120, adversarial attack logic 124, adversarial attack analysis logic 128, frontend interface 126, and action interface 130.

The machine learning engine 106 comprises natural language processing logic 108, training logic 112, and extracted model logic 116.

The machine learning engine 106, and the elements thereof, may be used to process informational content using natural language processing techniques, train an "extracted" white box model that simulates the operation of the external target black box reading comprehension model 132, and operate the extracted white box model during the execution of adversarial attacks. In this way, the machine learning engine 106, along with other elements of the system 100, may be used to analyze the operation of the external target black box reading comprehension model 132 with greater precision and accuracy than would be available from a direct analysis of the external target black box reading comprehension model 132 alone.

The natural language processing (NLP) logic 108 of the machine learning engine 106 may include instructions that, when executed, perform natural language processing of queries, target informational content items, and other similar instances of natural language. For example, NLP logic 108 may include instructions that, when directed to a target informational content item, may perform topic extraction, topic modeling analyses and/or feature vector generation techniques. In a general sense, the NLP logic may analyze input text and generate language tokens based on the input text. The tokens may then be used to generate feature vectors to facilitate various aspects of natural language processing.

In some examples, NLP logic 108 may perform term frequency (TF) or term frequency-inverse document frequency (TF-IDF) analyses to generate feature vectors corresponding to target informational content items. Additionally, or alternatively, NLP logic 108 may execute topic modeling techniques, such as latent Dirichlet allocation (LDA) or correlated topic modeling (CTM), as part of the natural language processing of a target informational content item. It will be appreciated that other types of vectors may be used in probabilistic analyses of informational content.

The training logic 112 of the machine learning engine 106 may operate in coordination with other components of the system 100 to train a white box reading comprehension machine learning model. As described below, the training logic 112 may be provided with a set of queries and the corresponding query results that have been transmitted to, and returned by, the target black box reading comprehension model 132. The queries and corresponding responses may be used by the training logic 112 to train a reading comprehension machine learning model stored in the extracted model logic 116. Once trained, the extracted model logic 116 may simulate the responses of the black box reading comprehension model 132. As described herein, training an extracted model enables a richer data set to be produced during adversarial attacks because a "white box" extracted model may display multiple query responses ranked according to corresponding confidence intervals. These data are not generally available from a black box model (e.g., model 132), which more likely provides a single query response (i.e., the response having a highest confidence score).

The extracted model 116 of the machine learning engine 106 may include two elements—an untrained model and a subsequently trained form of the model. The extracted model 116 is trained by the training logic 112 to simulate the analyses of the black box reading comprehension model 132. Once trained using training data, the extracted model 116 may, in some cases, generate the same or similar responses as those produced by the target black box reading comprehension model 132. In some examples, the extracted model 116, prior to training, may be any available reading comprehension machine learning model. One type of reading comprehension machine learning model that may be instantiated in the extracted model logic 116 includes, but is not limited to, bidirectional encoder representations from transformers (BERT).

The BERT model analyzes input content words non-sequentially, instead of left-to-right or right-to-left. In this example, the BERT model may be trained using two different training sets. A first training set, sometimes described as a Masked Token Prediction" (MTP) may conceal a percentage of the words in the set with a token that instructs the model to predict the concealed word based on the non-concealed vocabulary of the training set. A second training set, sometimes described as "Next Sentence Prediction" (NSP), may provide pairs of sentences and the model may be trained to predict whether the second sentence in the pair follows the first sentence of the pair. The BERT model is provided only for illustration. Other types of reading comprehension models, and more specifically, reading comprehension/question and answer models, may be used.

More generally, the trained extracted model logic 116 may be considered a "white box" machine learning model. White box models are those in which, in the context of adversarial attack analyses, the attacker has access to the various model parameters and outputs. As indicated herein, in this case a white box model will produce (and render accessible to an attacker) a plurality of query results and corresponding confidence intervals for those query results. This is unlike a black box model in which the attacker has access only to a query result based on specified inputs (e.g., a query and a target input informational content).

The model extraction logic 120 generates training data (applied by the training logic 112 to the extracted model logic 116) by submitting queries to the externally disposed black box reading comprehension model 132 and receiving corresponding query responses. The query responses may be used as labels for the corresponding queries. The queries and the corresponding labels may then be used as training data and accessed by the training logic 112 to train a model that is stored in the extracted model logic 116 of the machine learning engine 106.

In some cases, the model extraction logic 120 may communicate with various external data sources, stored in external resource 136 for example, to access question data and input informational content for the black box reading comprehension model 132. In one example, an input informational content item may be provided to or accessed by the black box reading comprehension model 132. Random or nonsensical queries may be generated using a word sampling algorithm (e.g., a Wiki scheme or a random scheme) from one or both of the informational content item and/or a corresponding vocabulary. In some examples, the model extraction logic 120 may access the Stanford Question and Answer Dataset (SQuAD) stored in external resource 136.

In some examples, the external resource may include stored sources of informational content 138. Examples of informational content include, but are not limited to any of a variety of content types that may be processed or otherwise analyzed by reading comprehension machine learning models. These may include social media posts, websites, electronically rendered text books, journal articles, machine rendered audio-to-text files, among other types of electronically renderable text.

Regardless of the technique by which queries are generated, the model extraction logic 120 submits the queries to the black box reading comprehension model 132. The model extraction logic 120 pairs queries with the corresponding results to generate training data, which is then used to train a model, thereby generating the extracted model logic 116 that simulates the analytical patterns and behaviors of the black box reading comprehension model 132.

The adversarial attack logic 124 may modify target informational content that is analyzed by the trained model instantiated in the extracted model logic 116. The adversarial attack logic 124 may then query the extracted model logic 116 regarding the modified informational content.

The adversarial attack logic 124 may modify the informational content using any of a number of techniques. In one example technique, the adversarial attack logic 124 may add an adversarial perturbation to one or both of a beginning of the informational content and/or an end of the informational content. In other cases, an adversarial perturbation may be added within the informational content (between the beginning and the end of the informational content). In some examples, the adversarial perturbation is generated using an "AddAny-kBest" algorithm in which tokens taken from one or both of the informational content and/or a query are collected into a "distractor sentence." Other similar algorithms may also be applied using the techniques described herein. While many examples of the adversarial perturbation include randomly arranged tokens, this need not be the case. In some examples, the adversarial attack logic 124 may revise the adversarial perturbation by selectively replacing one or more tokens with alternate tokens sampled from a vocabulary formed by a union of one or more of query tokens, common word tokens, and informational content tokens.

Having modified the target informational content, the adversarial attack logic 124 may then transmit queries to the extracted model logic 116 to test the accuracy and precision of the black box reading comprehension model 132. Queries may be generated using NLP logic 108 to generate tokens used in the query. Query tokens may be generated using a query database and/or a vocabulary formed from the informational content.

The adversarial attack analysis logic 128 determines whether a query response generated by the extracted model logic 116 is correct based on consistency with the informational content itself. If the system determines that the query response produced by the extracted model logic 116 is incorrect, the adversarial attack analysis logic 128 may replace one or more tokens in the adversarial perturbation and re-query the extracted model logic 116 using the same, previously transmitted query. This is described below in more detail.

Front end interface 126 manages interactions between the ML application 104 and clients 102A, 102B. For example, a client may submit requests to perform various functions and view results through the front end interface 126. A client in this context may be a computing device operated by a human user. In another context, the clients 102A, 102B may be another application, such as a shell or client application.

In some embodiments, front end interface 126 is a presentation tier in a multitier application. Front end interface 126 may process requests received from clients, such as clients 102A, 102B, and translate results from other application tiers into a format that may be understood or processed by the clients. Front end interface 126 may be configured to render user interface elements and receive input via user interface elements. For example, front end interface 126 may generate webpages and/or other graphical user interface (GUI) objects. Client applications, such as web browsers, may access and render interactive displays in accordance with protocols of the internet protocol (IP) suite. Additionally, or alternatively, front end interface 126 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In some embodiments, action interface 130 provides an interface for executing actions using computing resources, such as external resources 132 (target black box reading comprehension model), 136. Action interface 130 may include an API, CLI, or other interface for invoking functions to execute actions. One or more of these functions may be provided through cloud services or other applications, which may be external to ML application 104. For example, one or more components of system 100 may invoke an API of an email client application to access machine learning model databases and resources. In yet another example, action interface 130 may submit commands to reconfigure software and/or hardware resources. Thus, the actions that are performed may vary from implementation to implementation.

In some embodiments, actions may be automatically triggered based on outputs received from ML engine 110. For example, action interface 130 may trigger an action. Additionally, or alternatively, actions may be triggered responsive to client requests received through front end interface 126.

The target black box reading comprehension model 132, as indicated above, may be a reading comprehension machine learning model that analyzes informational content and responds to queries about the informational content. Unlike the "white box" model configured to simulate the analysis performed by the target black box reading comprehension model 132, generally the target black box reading comprehension model 132 transmits or displays the query response having a highest confidence level (or confidence score). This single datum is generally not preferred when determining the robustness (e.g., accuracy and precision) of the target black box reading comprehension model 132 when the input is subject to perturbations.

The external resource 136 may include databases, servers, or other systems that may communicate with the system 100 (e.g., via an API executed by the action interface 130). As indicated above, the external resource 136 may store query databases (e.g., SQuAD), informational content items, and various other resources described herein.

In one or more embodiments, a data repository 140 is any type of storage unit and/or device (e.g., a file system, database, collection of tables, or any other storage mechanism) for storing data. Further, a data repository 140 may include multiple different storage units and/or devices. The multiple different storage units and/or devices may or may not be of the same type or located at the same physical site. Further, a data repository 140 may be implemented or may execute on the same computing system as the system 100. Alternatively or additionally, a data repository 140 may be implemented or executed on a computing system separate from the system 100. A data repository 140 may be communicatively coupled to the system 100 via a direct connection or via a network.

Information describing the system 100 may be implemented across any of components within the system 100. However, this information is illustrated within the data repository 140 for purposes of clarity and explanation.

In one or more embodiments, the system 100 refers to hardware and/or software configured to perform operations described herein for the system 100. Examples of operations executed by the system 100 are described below with reference to FIG. 2.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In an embodiment, different components of the system 100 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interfaces of the system 100 may be specified in one or more other languages, such as Java, C, or C++.

3. Model Training and Adversarial Attack

Figure 2A:
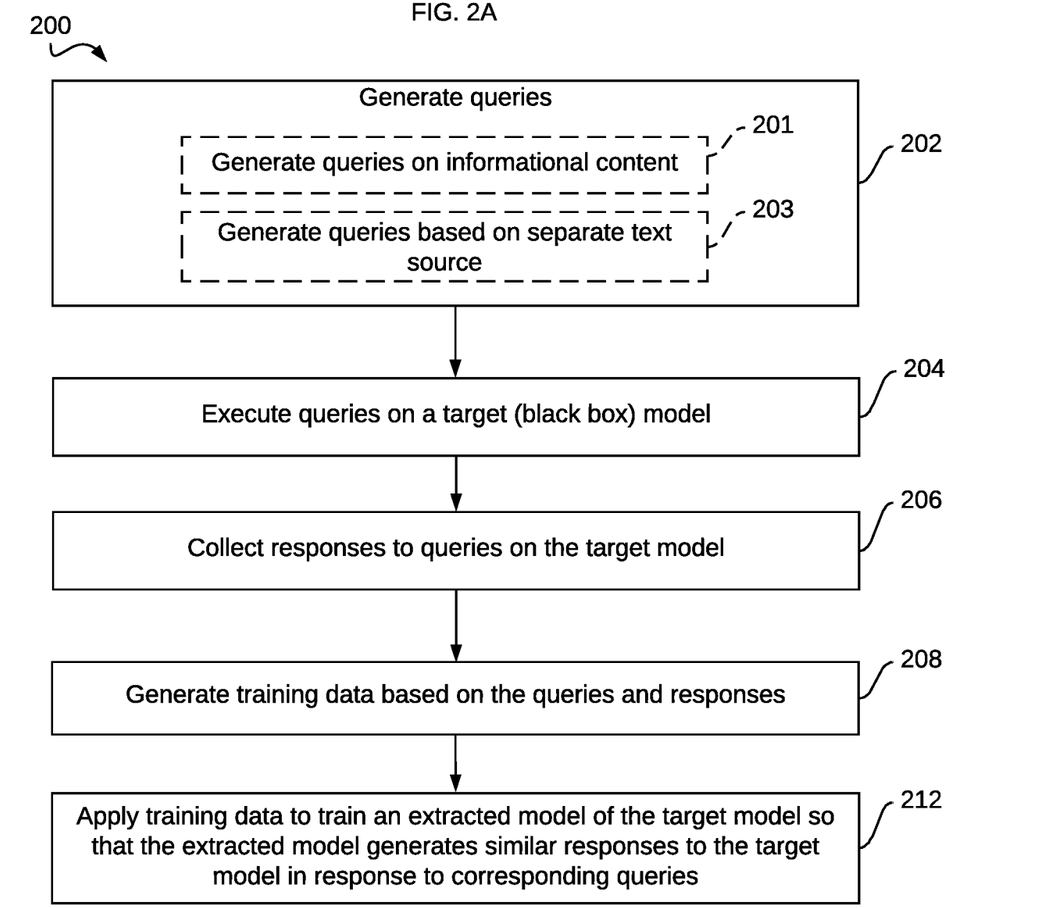
FIG. 2A illustrates an example set of operations for training a machine learning (ML) model to simulate performance of a target (black box) reading comprehension model.
Figure 2B:
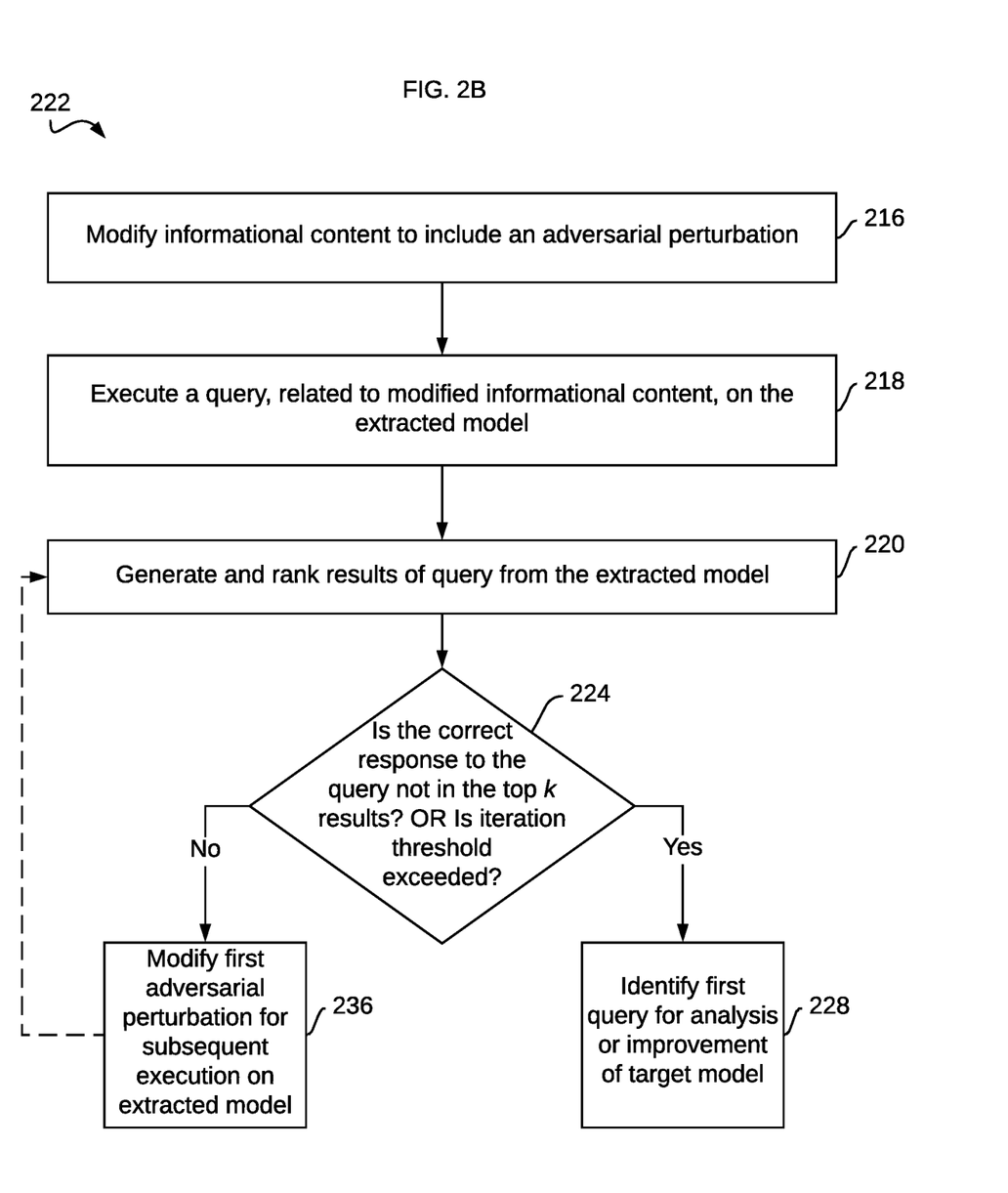
FIG. 2B illustrates an example set of operations for executing adversarial attacks on an extracted reading comprehension machine learning model, in accordance with one or more embodiments.

FIGS. 2A and 2B illustrate example sets of operations for training a white box reading comprehension machine learning model to simulate performance of a target black box model, and executing adversarial attacks on the extracted white box model, respectively, in accordance with one or more embodiments. The operations depicted in FIG. 2A, directed to training a white box reading comprehension machine learning model to simulate the operation of a black box model, are collectively described as method 200. The operations depicted in FIG. 2B, directed to executing one or more adversarial attacks on the extracted white box reading comprehension model as a simulation of the performance of an associated target black box model, are collectively described as method 222. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

Turning first to FIG. 2A, the method 200 may begin by generating queries to be executed (in subsequent operations) on a target model (operation 202). The system may formulate queries regardless of the type of content item, whether a portion of text from a book, an article, reference material, image caption, or the like. In some examples, queries of operation 202 may be generated based on a particular informational content item that will be analyzed by the target model (operation 201). That is, the system may generate queries using tokens selected from the informational content itself (i.e., the text to be queried) (operation 201).

In other embodiments the system may generate random or nonsensical queries generated using a word sampling algorithm applied to content (e.g., a text sample) (operation 203). In one example, the system generates nonsensical queries based on content (e.g., paragraphs, sentences, blocks of text, social media posts) from a text source using any of a number of content generation schemes (operation 203). In one example, a "Wiki" scheme may generate one or more queries from paragraphs or sentences of text selected from a text source (e.g., "WikiText—103"). In another example, a "Random" scheme may randomly sample words from a text source (e.g., "WikiText—103" among others) and use a vocabulary of randomly sampled words to generate queries. In some examples, SQuAD may be used to query the target model even though these queries may not necessarily correspond to the subject matter of the informational content.

The system may then execute some or all of the queries generated in operation 202 on a target model (operation 204). The target model, as described herein, may be a black box model (also referred to generically herein as a "first model"), the analytical operations of which are not directly obtainable. In response to the plurality of queries, the target model may generate query results.

Once the system generates and executes queries on the target model, the responses are collected (operation 206). The collected responses are used as labels for the corresponding queries. By pairing queries with corresponding result labels, the system thus generates training data as a result of the queries with the target (black box) reading comprehension model (operation 208).

The system then may use the training data to train an extracted machine learning model (also referred to generically as a "second model"), and in particular, train a reading comprehension machine learning model (operation 212). Using the training data generated from interactions with the target (black box) model enables the extracted model to simulate or approximate analytical results generated by the target model. Examples of the extracted model include BERT, although other models and model types may be used. As indicated above, using the extracted model enables an attacker to view many results to a query and the confidence scores corresponding to the results.

Turning to FIG. 2B, having trained an extracted machine learning model, the system may commence adversarial attacks on the extracted machine learning model. The trained extracted machine learning model mimics or simulates the performance of the target model in response to the adversarial attacks.

In preparation for executing these adversarial attacks, the method 222 may begin with the system modifying informational content with an "adversarial perturbation" (operation 216). Examples of an adversarial perturbation may include the addition of a distracting sentence, phrase, or word(s) to the text of the text of the informational content.

In various examples, the system may add an adversarial perturbation to one or both of a beginning of the informational content and/or an end of the informational content. In other cases, an adversarial perturbation may be added within the informational content (between the beginning and the end of the informational content).

In some examples, the adversarial perturbation is generated using an "AddAny-kBest" algorithm in which tokens taken from one or both of the informational content and/or a query are collected into a "distractor sentence." Pseudo code of the "AddAny-kBest" algorithm follows as "Algorithm 1." The AddAny-kBest algorithm may start with a distractor sentence of randomly arranged tokens that are iteratively modified until, for example, a model generates an incorrect query response or a threshold number of queries are submitted. In some examples, tokens used to generate a distractor sentence may be selected from libraries of common word tokens, question libraries (e.g., SQuAD), or both. Other similar algorithms may also be applied using the techniques described herein. While many examples of the adversarial perturbation include randomly arranged tokens, this need not be the case.

---

Algorithm 1: ADDANY-KBEST Attack for a context and question pair

```
s = w1w2w3...wn
q = question string
c = context
qCand [ ] // placeholder for generated adversarial candidates
qCandScores = [ ] // placeholder for F1 scores of generated adversarial candidates
minF1running = INF
argMaxScores = [ ]
for i ← 0 to n 1 do
| W = randomlySampledWords( ) // Randomly samples a list of K candidate words from a Union of
| query and common words.
| qCand = [ ]
| for j ← 0 to len(W) 1 do
| | sDup = s
| | sDup[i] = W[k] // The ith index replaced
| | qCand.append(sDup)
| end
| for j ← 0 to len(qCand) 1 do
| | advScore = getF1Adv(c + qCand[j].q) // Weighted F1 score of the model's top k outputs
| | qCandScores.append(advScore)
| end
| bestCandInd = indexOfMin(qCandScores) // Retrieve the index with minimum F1 score
| lowestScore = min(qCandScores) // Retrieve the candidate with minimum F1 score
| if lowestScore = minF1running then
| | minF1running = lowestScore
| | s[i] = W[bestCandInd]
```

Algorithm 1: ADDANY-KBEST Attack for a context and question pair

| | // a better sequence s was discovered with lower score, so replaces the token at index i
| end
end Once modified, the system may execute the query related to the modified informational content on the extracted model (operation 218). The query may be generated using tokens from a query database and/or from a vocabulary formed from the informational content and/or modified informational content. Once generated, the query may be submitted to (or executed on) the extracted model, which generates query results.

The system receives query results from the extracted model (operation 220). The query results include a plurality of query results and their associated confidence scores, as is consistent with the "white box" configuration of the extracted model. The system may rank the results according to, for example, the associated confidence scores (e.g., from highest confidence score to lowest).

The system analyzes a sub-set of the highest ranked results ("k highest results") to determine whether the correct response is present in any of the top k responses (operation 224). In some examples, whether a response is correct or incorrect is determined based on a consistency between the response and the informational content itself. In some examples, determining whether the query response is correct may be based on a similarity score (e.g., based on cosine similarity analysis) between vectors generated from the query and some or all of the informational content. In other examples, an "F1" score may be used to determine correctness of a query result. In still other examples, the system may compare a query result to the informational content itself to identify an exact match between the query result and a portion of the informational content that was the subject of the query.

This criteria of evaluating the accuracy of all of the k highest results, and not merely the highest ranked result, may be more stringent than that applied to other models. This more stringent criteria is in appreciation of the fact that the extracted model is a simulation of the target (black box) reading comprehension model. Because the extracted model may not perform exactly like the target model, the system may apply the more stringent criteria to more thoroughly determine whether an adversarial attack has successfully caused the extracted model to generate an incorrect query response. The subset of k responses can be selected based on a threshold rank value (e.g., the top 5, top 10, top 100 confidence score responses), a threshold confidence value (e.g., responses above a threshold confidence score of 80%, 90%, 95%), or other similar criteria.

If neither of the conditions of operation 224 are met, then the method 200 proceeds to operation 236 in which the adversarial perturbation is modified for subsequent execution on the extracted model (operation 236). The system may replace one or more tokens in the adversarial perturbation and re-query the extracted model using the same, previously transmitted query. These replacement tokens may be selected from a vocabulary formed by a union of one or more of query tokens, common word tokens, and informational content tokens. The process may then repeat from the operation 220 until either none of the k highest ranked responses contain a correct answer or a threshold number of iterations are completed with no error, thus indicating that the extracted model meets an accuracy and/or precision expectation.

If one or both of the conditions of the operation 224 are met, then the query is identified for improvement to the target model (operation 228).

4. Example Embodiment

Figure 3:
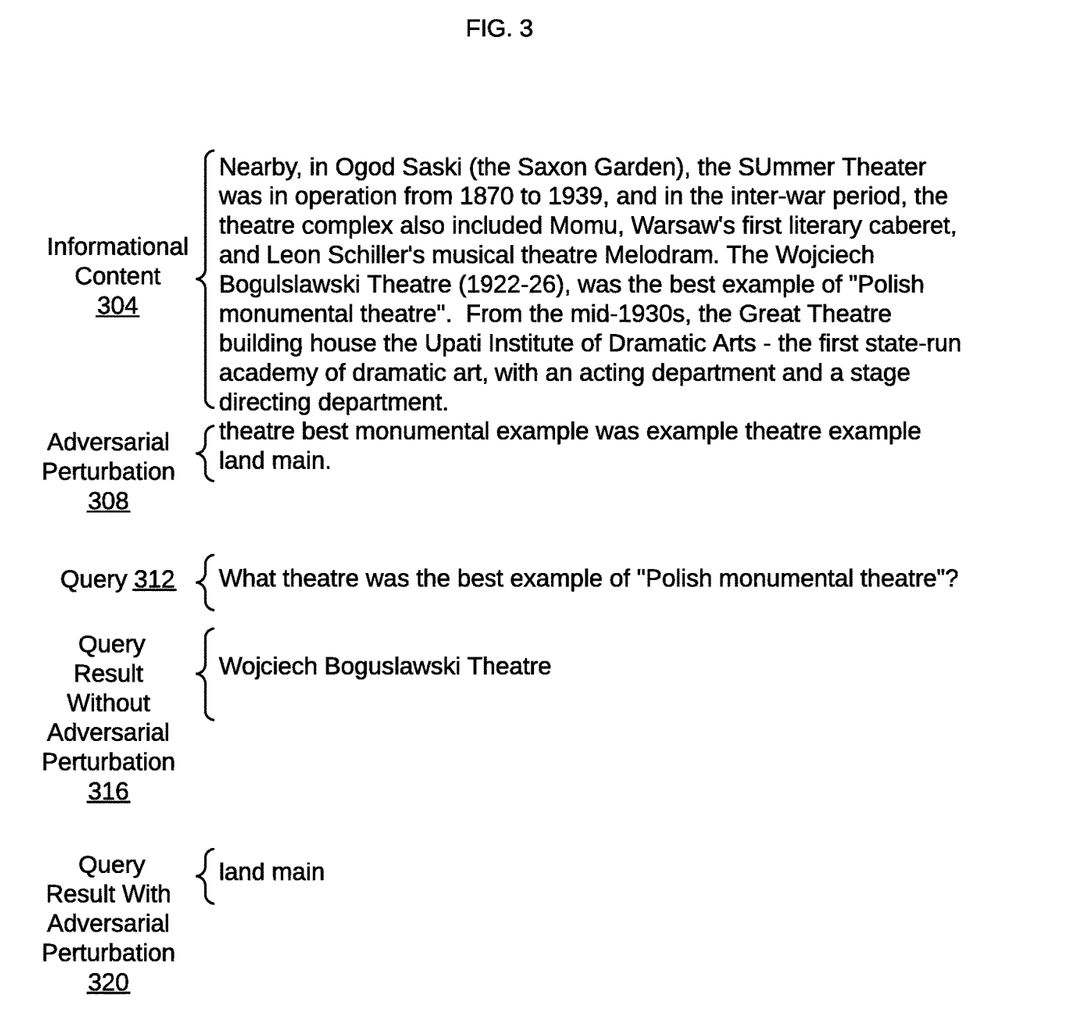
FIG. 3 illustrates an example scenario in which an adversarial perturbation is appended to informational content, and query responses based on the original content and the perturbed content are shown.

FIG. 3 illustrates an example scenario in which an adversarial perturbation is appended to information content, and a reading comprehension query is submitted to a white box model trained using some of the embodiments described above.

As shown, informational content 304 may be presented to the system with adversarial perturbation 308 appended to the end of the informational content 304. In this embodiment, the adversarial perturbation 308 includes some words (converted to tokens when processed by the machine learning model) selected form the informational content itself ("theatre," "best," "monumental," "example," "was") as well as nonsensical words ("land," "main").

A query 312 may be submitted to a trained white box reading comprehension model that has analyzed the informational content 304 both with and without the adversarial perturbation 308. The trained model may produce the result 316 in response to executing the query on the informational content 304 without the adversarial perturbation 308. This result produces an answer that is consistent with the informational content 304. The result 320 produced by execution of the query on the informational content that does include the adversarial perturbation 308. As can be seen, this result consists of the nonsensical words of the adversarial perturbation 308.

Based on this result, additional queries, results, and corresponding confidence intervals may be submitted and analyzed to improve the operation of a trained white box model. This may in turn be used to understand a corresponding black box model, as described above.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
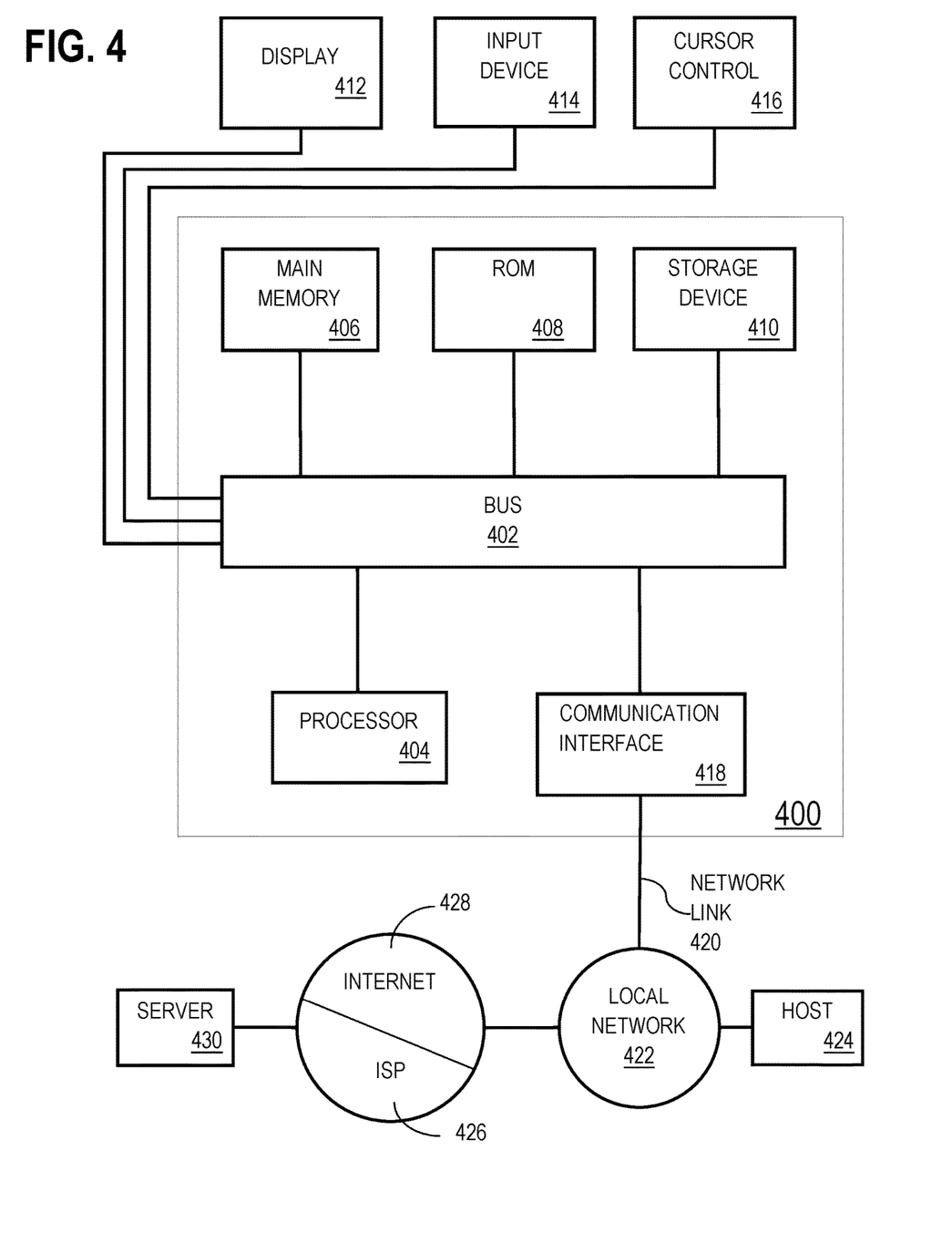
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   executing a first plurality of queries on a first model to obtain a first set of results corresponding to the first plurality of queries;
   generating training data comprising the first plurality of queries and the first set of results corresponding to the first plurality of queries;
   applying the training data to train a second model to generate a second set of results in response to a second plurality of queries, the second set of results meeting one or more similarity criteria to a third set of results for the second plurality of queries generated by the first model;
   modifying informational content for query execution to include a first set of one or more adversarial perturbations;
   executing a query on the second model to generate a fourth set of results based on the modified informational content comprising the first set of one or more adversarial perturbations;
   determining that k highest ranked results in the fourth set of results are incorrect; and
   responsive to determining that the k highest ranked results in the fourth set of results are incorrect, identifying the query for analysis or improvement of the first model.

2. The media of claim 1, further comprising:
   generating a plurality of confidence scores corresponding to the fourth set of results; and
   using the confidence scores to rank the corresponding results from a highest confidence score to a lowest confidence score.

3. The media of claim 1, wherein:
   the first model comprises a black box model displaying a query interface and a response interface configured to display the responses to each of the queries of the first plurality of queries; and
   the second model comprises a white box model that is a simulation of the black box model, the white box model displaying a second query interface configured to display the fourth set of results in response to the query and also display a first set of confidence intervals corresponding to the fourth set of results.

4. The media of claim 1, wherein determining the k highest ranked results in the first set of results are incorrect comprises one or both of:
generating an F1 accuracy score indicating that each of the k highest ranked results is incorrect; and
responsive to comparing the plurality of k highest ranked results in the fourth set of results with the information content, determining an absence of exact matches there between.

5. The media of claim 1, wherein the adversarial perturbations comprise a plurality of terms selected from the informational content or terms having a similarity score above a threshold with the plurality of terms selected from the informational content.

6. The media of claim 5, wherein:
the plurality of terms are selected randomly from the informational content; and
appended to one of a beginning or an ending of the informational content.

7. The media of claim 1, wherein the first model is a target black box model and the second model is an extracted white box model.

8. The media of claim 1, wherein:
the first model comprises a black box model;
the second model comprises a white box model;
applying the training data to train the second model comprises training the white box model to simulate the black box model; and
the fourth set of results comprises a plurality of results and a plurality of confidence levels corresponding to the plurality of results.

9. The media of claim 1, wherein:
the fourth set of results comprises a plurality of individual results and a plurality of confidence levels corresponding to the plurality of individual results; and
determining that the k highest ranked results in the fourth set of results are incorrect comprises:
ranking the plurality of individual results based on the corresponding confidence levels of the plurality of confidence levels.

10. One or more non-transitory machine-readable media storing instructions which, when executed by one or more processors, cause:
executing a first plurality of queries on a first model to obtain a first set of results corresponding to the first plurality of queries;
generating training data comprising the first plurality of queries and the first set of results corresponding to the first plurality of queries;
applying the training data to train a second model to generate a second set of results in response to a second plurality of queries, the second set of results meeting one or more similarity criteria to a third set of results for the second plurality of queries generated by the first model;
modifying informational content for query execution to include one or more adversarial perturbations;
executing a query on the second model to generate a fourth set of results based on the modified informational content comprising the one or more adversarial perturbations;
wherein the fourth set of results comprises a correct answer to the query; and
responsive to determining one of (1) a confidence level of the correct answer is below a threshold confidence value or (2) a ranking associated with the correct answer is below a threshold rank value:
identifying the query for analysis or improvement of the first model.

11. The media of claim 10, wherein:
the first model comprises a black box model displaying a query interface and a response interface configured to display the responses to each of the queries of the first plurality of queries; and
the second model comprises a white box model that is a simulation of the black box model, the white box model displaying a second query interface configured to display the fourth set of results in response to the query and also display a first set of confidence intervals corresponding to the first set of results.

12. The media of claim 10, wherein determining the fourth set of results comprises a correct answer comprises one or both of:
generating an F1 accuracy score indicating a correct result; and
responsive to comparing the correct answer with the information content, determining corresponding exact matches there between.

13. The media of claim 10, wherein the adversarial perturbations comprise a plurality of terms selected from the informational content or terms having a similarity score above a threshold with the plurality of terms selected from the informational content.

14. The media of claim 13, wherein:
the plurality of terms are selected randomly from the informational content; and
appended to one of a beginning or an ending of the informational content.

15. The media of claim 10, wherein the first model is a target black box model and the second model is an extracted white box model.

16. One or more non-transitory machine-readable media storing instructions which, when executed by one or more processors, cause:
executing a first plurality of queries on a first model to obtain a first set of results corresponding to the first plurality of queries;
generating training data comprising the first plurality of queries and the first set of results corresponding to the first plurality of queries;
applying the training data to train a second model to generate a second set of results in response to a second plurality of queries, the second set of results meeting one or more similarity criteria to a third set of results for the second plurality of queries generated by the first model;
modifying informational content for query execution to include a first set of one or more adversarial perturbations;
executing a query on the second model to generate a fourth set of results based on the modified informational content comprising the first set of one or more adversarial perturbations;
determining none of a plurality of k highest ranked results in the fourth set of results are incorrect;
responsive to determining that none of the k highest ranked results in the fourth set of results are incorrect, modifying the first set of one or more adversarial perturbations to a second set of one or more adversarial perturbations to generate a revised modified information content; and executing the query on the second model to generate a fifth set of results based on the revised modified informational content comprising the second set of one or more adversarial perturbations.

17. The media of claim 16, further comprising:

generating a plurality of confidence scores corresponding to the fourth set of results; and using the confidence scores to rank the corresponding results from a highest confidence score to a lowest confidence score.

18. The media of claim 16, wherein:

the first model comprises a black box model displaying a query interface and a response interface configured to display the responses to each of the queries of the first plurality of queries; and the second model comprises a white box model that is a simulation of the black box model, the white box model displaying a second query interface configured to display the fourth set of results in response to the query and also display a first set of confidence intervals corresponding to the fourth set of results.

19. The media of claim 16, wherein determining the plurality of k highest ranked results in the fourth set of results are not incorrect comprises one or both of:

generating an F1 accuracy score indicating correct results; and responsive to comparing the plurality of k highest ranked results in the fourth set of results with the information content, determining corresponding exact matches there between.

20. The media of claim 16, wherein the adversarial perturbations comprise a plurality of terms selected from the informational content or terms having a similarity score above a threshold with the plurality of terms selected from the informational content.

21. The media of claim 20, wherein:

the plurality of terms are selected randomly from the informational content; and appended to one of a beginning or an ending of the informational content.

22. The media of claim 16, wherein the first model is a target black box model and the second model is an extracted white box model.

* * * * *

UNITED STATES PATENT AND TRADEMARK OFFICE
CERTIFICATE OF CORRECTION

PATENT NO. : 12,265,890 B2
APPLICATION NO. : 17/115941
DATED : April 1, 2025
INVENTOR(S) : Nizar et al.

Page 1 of 1

It is certified that error appears in the above-identified patent and that said Letters Patent is hereby corrected as shown below:

On the Title Page

Column 1, under Prior Publication Data, Line 1, below "US 2022/0051134 A1 Feb. 17, 2022" insert item (30) -- (30) Foreign Application Priority Data Aug 14, 2020 (IN) ..... 202041034978 --, as a new entry.

In the Specification

In Columns 9-10, Line 67, delete "=" and insert -- <= --, therefor.

Signed and Sealed this
Seventeenth Day of June, 2025

Coke Morgan Stewart
*Acting Director of the United States Patent and Trademark Office*